(12) United States Patent
Anderson et al.

(10) Patent No.: US 6,844,885 B2
(45) Date of Patent: Jan. 18, 2005

(54) IMAGE EDITING VIA GRID ELEMENTS

(75) Inventors: Jeff M. Anderson, Camas, WA (US); Stephen D Dentel, Vancouver, WA (US); David Staas, Camas, WA (US); Lainye Heiles, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 435 days.

(21) Appl. No.: 10/010,374

(22) Filed: Nov. 30, 2001

(65) Prior Publication Data

US 2003/0103060 A1 Jun. 5, 2003

(51) Int. Cl.[7] .............................. G06T 3/40; G06T 3/60
(52) U.S. Cl. ....................... 345/650; 345/661; 345/676
(58) Field of Search ................................. 345/650–654, 345/661–665, 676–680

(56) References Cited

U.S. PATENT DOCUMENTS

| | | | | |
|---|---|---|---|---|
| 5,752,053 A | * | 5/1998 | Takakura et al. | 715/505 |
| 5,790,708 A | * | 8/1998 | Delean | 382/270 |
| 5,844,570 A | * | 12/1998 | Curtright et al. | 345/629 |
| 2002/0063717 A1 | * | 5/2002 | Minner et al. | 345/557 |

OTHER PUBLICATIONS

Adobe Photoshop 5.0 User Guide, 1998, pp. 173–177.*

* cited by examiner

*Primary Examiner*—Jeffery Brier

(57) ABSTRACT

An image editing program includes a user interface for displaying a work area and receiving image edit inputs; and an engine for overlaying a grid on the work area, and using grid elements to generate commands in response to the image edit inputs.

17 Claims, 6 Drawing Sheets

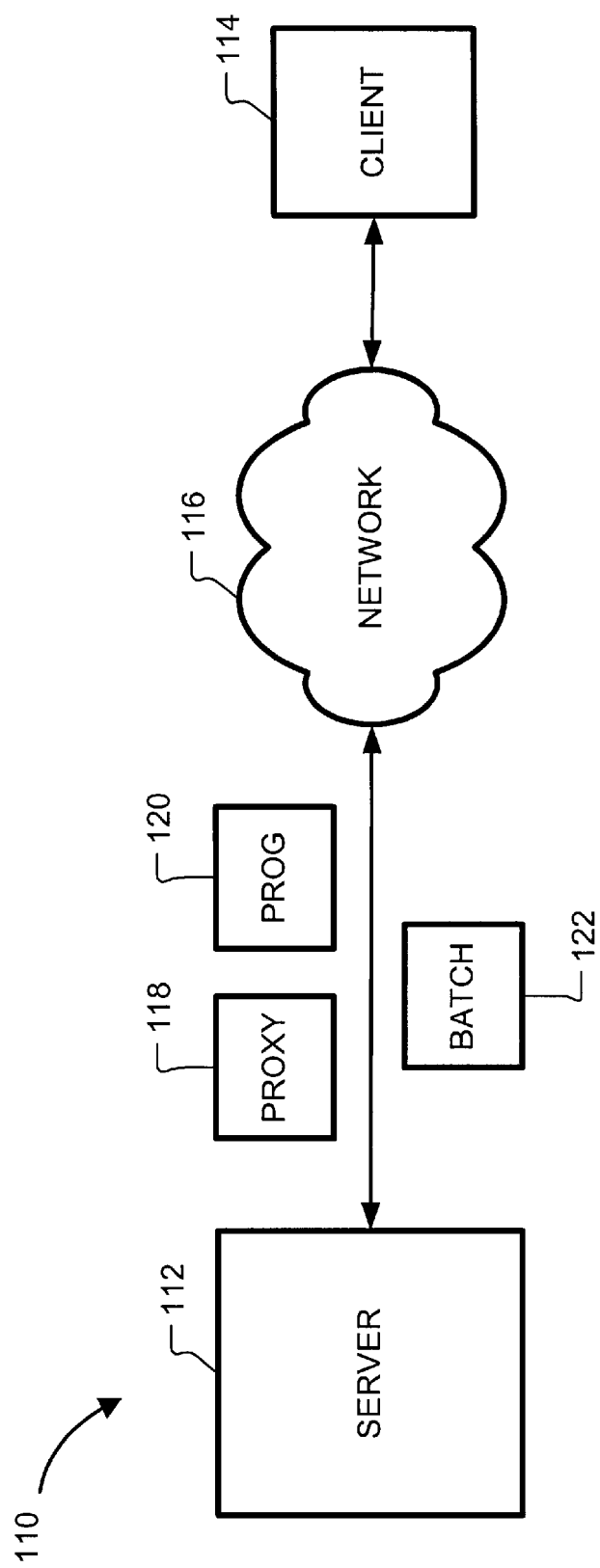

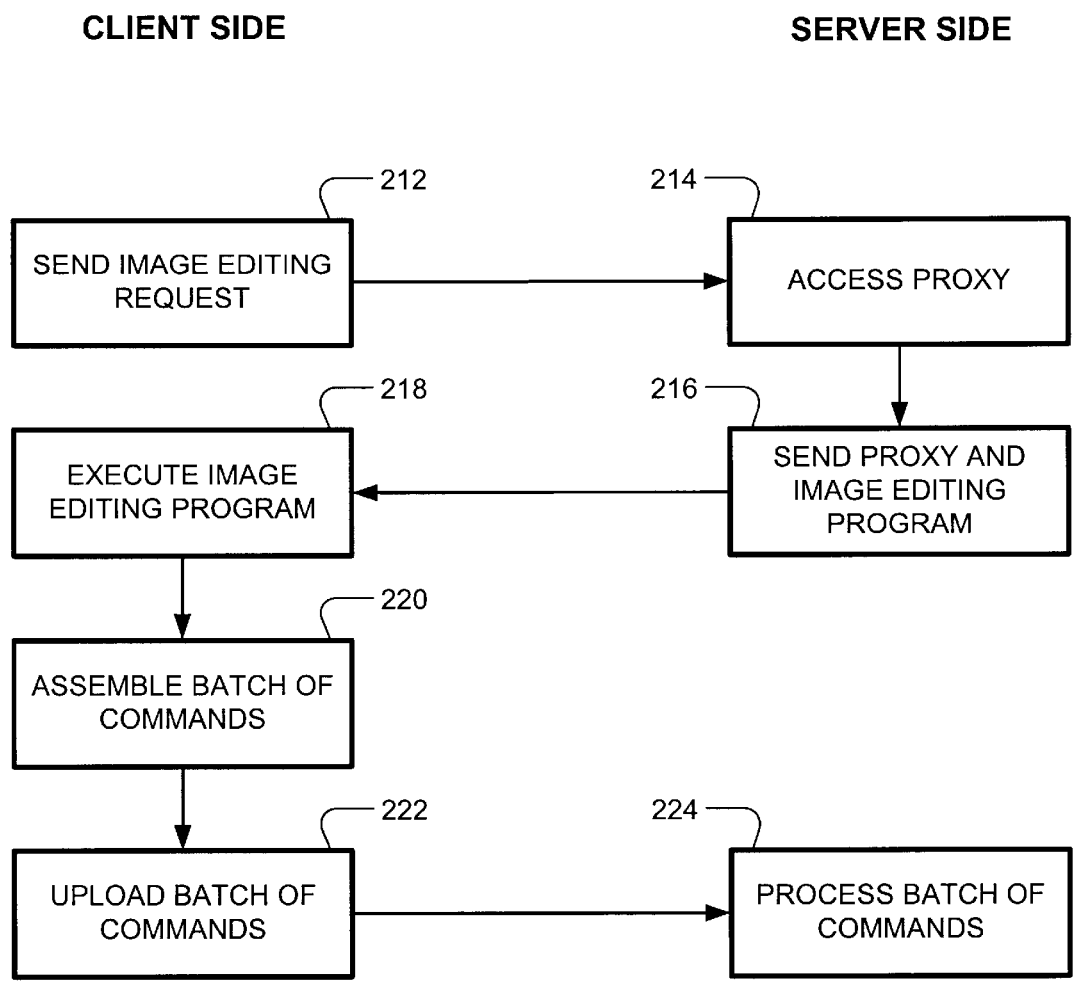

IMAGE EDITING VIA GRID ELEMENTS

BACKGROUND

Cartogra.com is a photo sharing web site that offers various services to clients. Digital images can be organized in albums by topic or event, and shared with friends and family. Digital images can be incorporated in post cards and greeting cards, and they can be posted to online auction sites, ads, and home pages. Personal photos can be combined with colorful animated frames and music to create multimedia slide shows. Clients can select digital images and choose the size and number of copies, and service providers can make photo-quality prints from the digital images.

The digital images and the photo sharing web sites are stored on servers. A client uploads digital images to a server, and the server formats the images on the fly for a main catalog page. Other clients can then access the images via a network such as the Internet.

The clients may be personal computers. However, one advantage of the photo sharing web sites is that they allow photo sharing, organizing, and viewing activities by clients other than personal computers. Other types of clients include digital cameras, scanners, game consoles, set-tops, PDAs, and other photo-ready, Internet-ready devices.

On-line image editing tools enable clients to edit and enhance their digital images with features such as auto fix, zoom, red-eye removal, crop, rotate, brightness, and contrast prior to sharing or printing.

On a personal computer, on-line editing can be easier to perform than downloading an image from a web site, running a standalone image editing program, using the standalone program to edit the image, and then uploading the edited image back to the web site. Moreover, standalone image editing programs tend to have complex interfaces.

With certain other clients, on-line editing is the only way to edit digital images. A client such as a "WebTV" interface usually does not have sufficient memory to store a standalone image editing program.

Some services take silver halide film, generate digital images from the silver halide film, and post high resolution digital images directly to web sites. If customers are not allowed to modify the high resolution images, on-line editing affords the only way of making changes to the high resolution images.

SUMMARY

According to one aspect of the present invention, an image editing program includes a user interface for displaying a work area and receiving image edit inputs; and an engine for overlaying a grid on the work area, and using grid elements to generate commands in response to the image edit inputs.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1 is an illustration of an on-line image editing system in accordance with an embodiment of the present invention.

FIG. 2 is an illustration of communication between a client and a server of the image editing system.

DETAILED DESCRIPTION

Figure 3A:
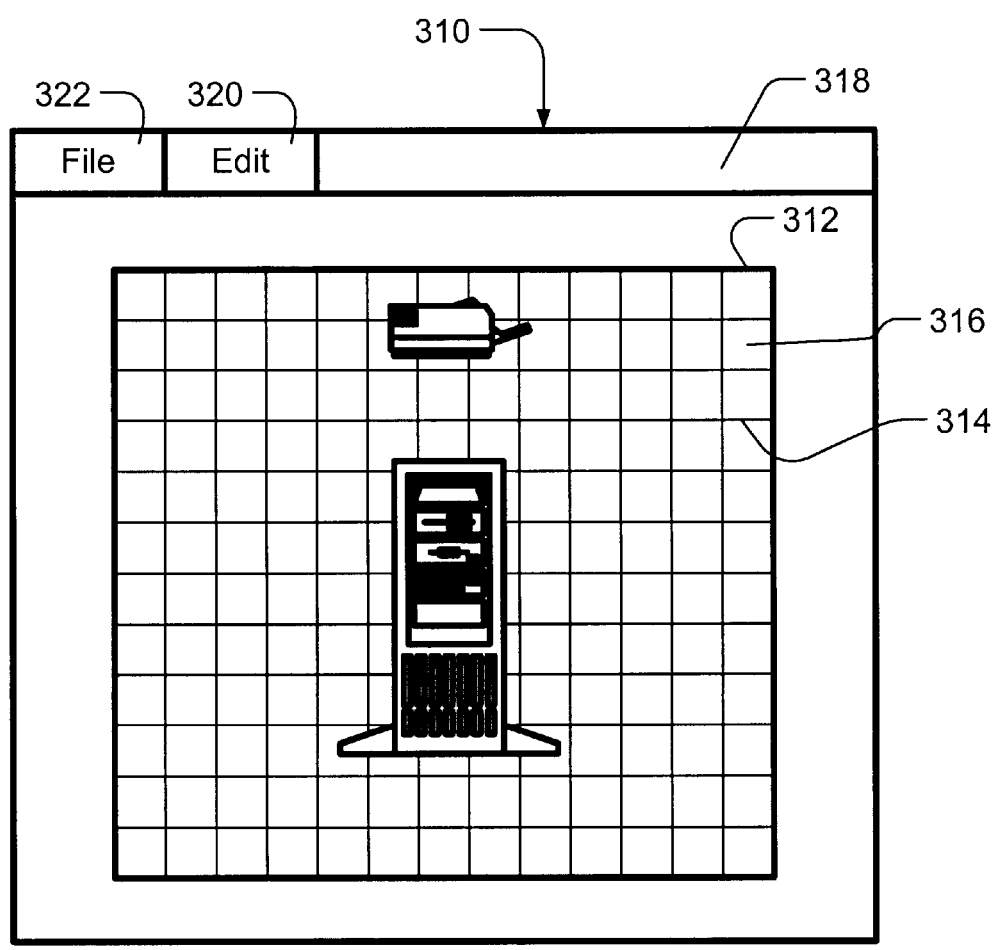
FIGS. 3a–3c are illustrations of a user interface for an image editing program of the on-line image editing system.

As shown in the drawings for purposes of illustration, the present invention is embodied in a program for editing digital images. The image editing program has a simple architecture that lends itself to on-line image editing. However, the image editing program may used off-line, as stand alone program. In the paragraphs that follow, an on-line image editing program will be described. Then a standalone image editing program will be described.

Reference is made to FIG. 1, which shows the on-line image editing system 110. The server 112 and the client 114 communicate over a network 116. There is no limitation on the type of network 116. For example, the network 116 may be a local area network or the Internet.

The client 114 may be any machine that can receive the proxy 118 and image editing program 120 from the network 116, display the proxy 118, execute the image editing program 120, accept inputs for editing the proxy 118, and allow the image editing program 120 to upload the batch 122 of commands back to the server 112. Exemplary clients 114 include personal computers, handheld computers, personal digital assistants, Internet appliances, WebTV interface, etc.

The proxy 118 is a low resolution version of the image to be edited. The proxy 118 and the image may be stored on the server 112 or on another machine. The server 112 or another machine may alternatively generate the proxy 118 on-the-fly. Actual resolution of the proxy 118 is application-specific.

The server 112 may be any machine that can transmit the proxy 118 and the image editing program 120 in response to a client request, and receive the batch 122 of commands from the client 114. The server 112 or another machine may edit the image (or a copy of it) in accordance with the command batch 122.

The image editing program 120 includes an interface for displaying the unedited proxy 118, allowing a user to edit the proxy 118, and displaying the proxy 118 after editing. The image editing program 120 further includes an engine for generating commands that correspond to the edits, and uploading the commands as a batch 122. Exemplary edits include 1) 90 degree rotation CCW; 2) red eye removal; 3) 50% increase in contrast; 4) crop 13% off top; 5) crop 10% off right side; and 6) zoom 30%. If all of these edits are performed on a proxy, the engine generates six corresponding commands and sends the six commands together, as a batch 122, to the server 112.

The interface of the image editing program 120 may be a graphical user interface. The graphical user interface and the exemplary image editing operations will be described below.

There is no limitation on the types of tools offered by the image editing program. Exemplary types of image editing tools include auto fix, zoom, red-eye removal, crop, rotate, brightness, and contrast.

There is no limitation as to how the image editing program 120 is implemented. For example, the image editing program 120 could be embedded in a web page file (e.g., an HTML file) as a script (e.g., written in JavaScript or another scripting language), or the image editing program 120 could be a Java applet that is called by the web page file. The image editing program 120 could be a plug-in to a web browser, or it could be an "Active X" control. The image editing program 120 may be stored on the server, the client, or another machine.

Additional reference is now made to FIG. 2, which illustrates the communication between the server 112 and the client 114. The client 114 sends a request to perform on-line editing of a high resolution image (212).

The server 112 receives the request and, in response, accesses a proxy 118 of the image (214), and sends the proxy 118 and the image editing program 120 to the client 114 (216).

The client 114 receives the proxy 118 and the image editing program 120, and executes the image editing program 120 (218). The image editing program 120 causes the client 114 to display the proxy 118 and a user interface. The user interface allows a user to perform edits on the proxy. Editing commands may be generated in real time, as the edits are being made.

After all edits have been made, the image editing program 120 causes the client 114 to assemble the commands in a batch (220) and upload the batch 122 of commands to the server 112 (222).

The server 112 receives and processes the command batch (224). At this point, the server 112 can use the commands to edit the high resolution image, or it can pass the commands to another machine, which performs the editing (e.g., automatically, or manually by a person accessing the commands and manually making the edits).

The server 112 could also store the commands as an edit history on the image. As a result, changes to the image could be rolled back (that is, undone).

Figure 3B:
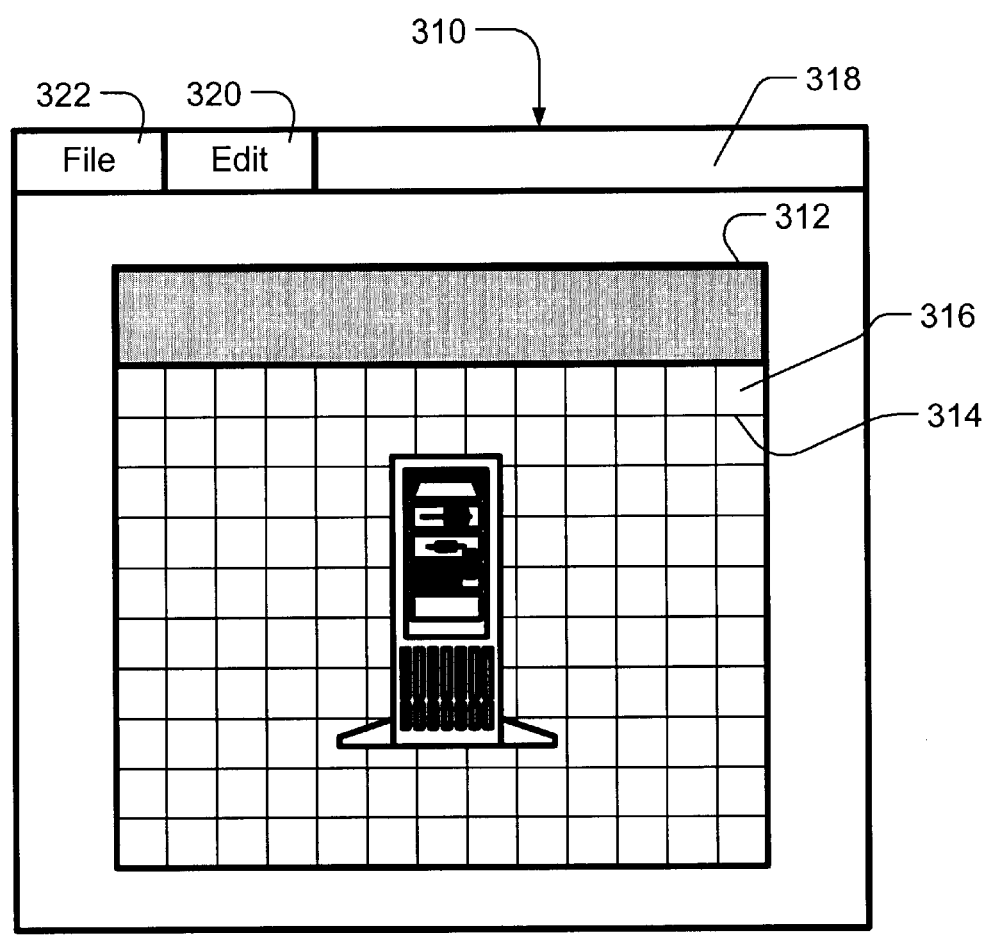
Figure 3C:
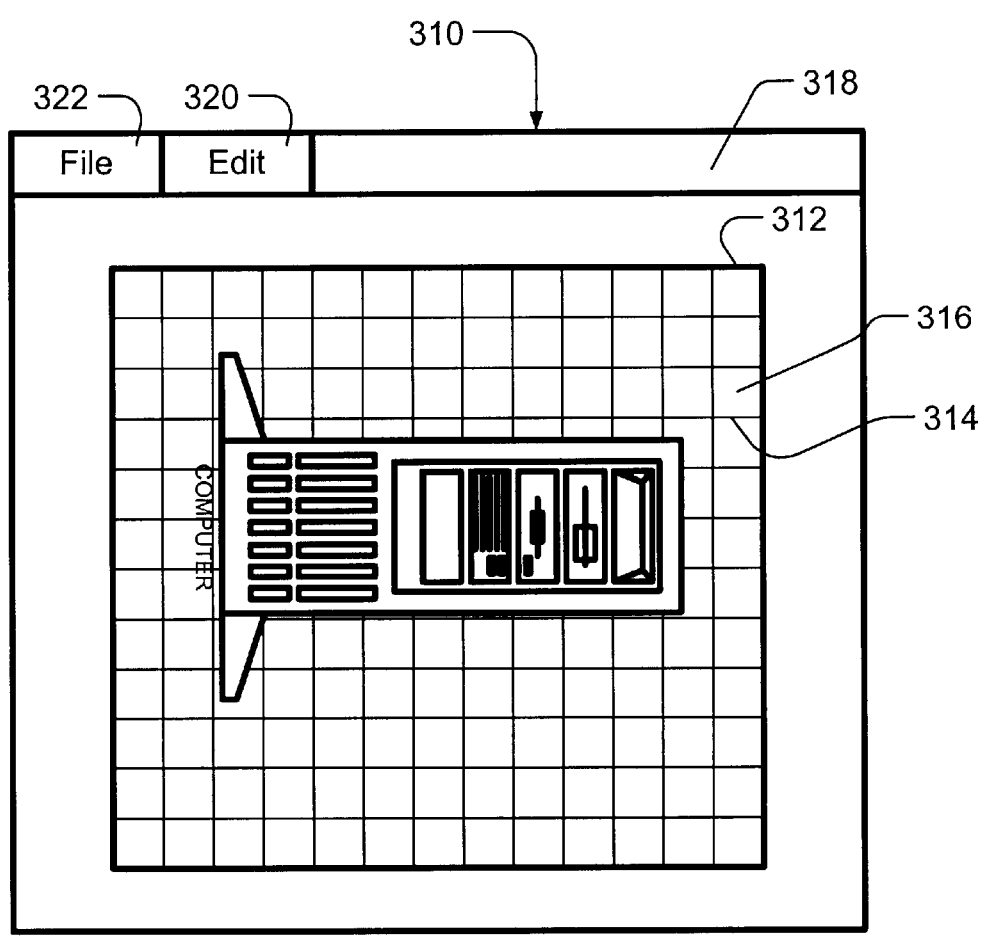

FIGS. 3a–3c show an exemplary graphical user interface (GUI) 310 for the image editing program 120. FIGS. 3a–3c also illustrate how the engine may generate the commands.

Referring to FIG. 3a, the GUI 310 includes a viewing area 312 for displaying the proxy 118. Overlaying the viewing area 312 is a grid 314. The grid 314 is made up of individual grid elements 316. The grid 314 may be visible or invisible.

The GUI 310 further includes a menu bar 318. At least one of the entries 320 in the menu bar 318 lists tools for editing the proxy 118. Editing tools described in connection with FIGS. 3a–3c include without limitation a cropping tool, a rotation tool, a text tool, and a resize tool.

The cropping tool allows a user specify the grid elements 316 to be removed. The grid elements 316 may be specified in any number of ways. For example, the GUI 310 may allow the user to specify and delete the grid elements with a mouse (e.g., by selecting the cropping tool from the menu bar 318, and pointing to and clicking a column or row to be deleted). When a grid element 316 is cropped, the grid element 316 becomes translucent or opaque. Thus the cropped grid element 316 is at least partially obscured. Turning off the grid elements 316 that are cropped allows a user to see the areas that have been cropped. The cropped image is shown in FIG. 3b.

When the cropping is finished, the engine determines the percentage that each side has been cropped, and generates a command indicating such. The grid elements 316 may be used to determine the percentages. Precision of the cropping is determined by granularity of the grid elements 316. Consider a coarse grid having a 10×10 array of grid elements 316. Such a coarse grid would allow cropping at 10% intervals. If a single column of grid elements 316 is cropped off the left side of the proxy 118, the engine would generate the following command: crop 10% off left side. Now consider a finer grid having a 100×100 array of grid elements 316. The finer grid would allow cropping at 1% intervals. If all six columns of grid elements 316 are cropped off the left side of the proxy 118, the engine may generate the following command: crop 6% off left side.

The rotation tool allows the proxy 118 to be rotated by a pre-set amount (e.g., 180 degrees) or a custom amount (e.g., 14.5 degrees CCW). After rotation is performed, the engine may generate a command indicating the amount and direction of rotation.

The text tool allows a string of text to be added to the proxy 118. After the text is added, the engine may generate a command indicated the text to be added and the starting point and ending points of the text. The engine may identify the grid elements 316 containing the starting and ending points of the text, and use those grid elements to determine the starting and ending points as percentages (e.g., starting point is 10% from left side and 50% from top).

FIG. 3c shows the cropped image, rotated and resized, with text added.

Another menu item 322 on the tool bar 318 gives the option of accepting the changes. If changes are accepted, the commands are sent to the server. If the changes are not accepted, the commands are not sent to the server 112.

The image editing program is not limited to the graphical user interface shown in FIGS. 3a–3c, nor is it limited to the image editing tools described above. The image editing program is not even limited to a graphical user interface. For example, the image editing program could accept line commands or another form of input.

The image editing program is not limited to the grid resolution shown in FIGS. 3a–3c. The grid resolution is application-specific. A finer grid resolution will provide greater accuracy, but slower editing speed.

The system is not limited to a single client. Multiple clients may be connected to the network.

Figure 4:
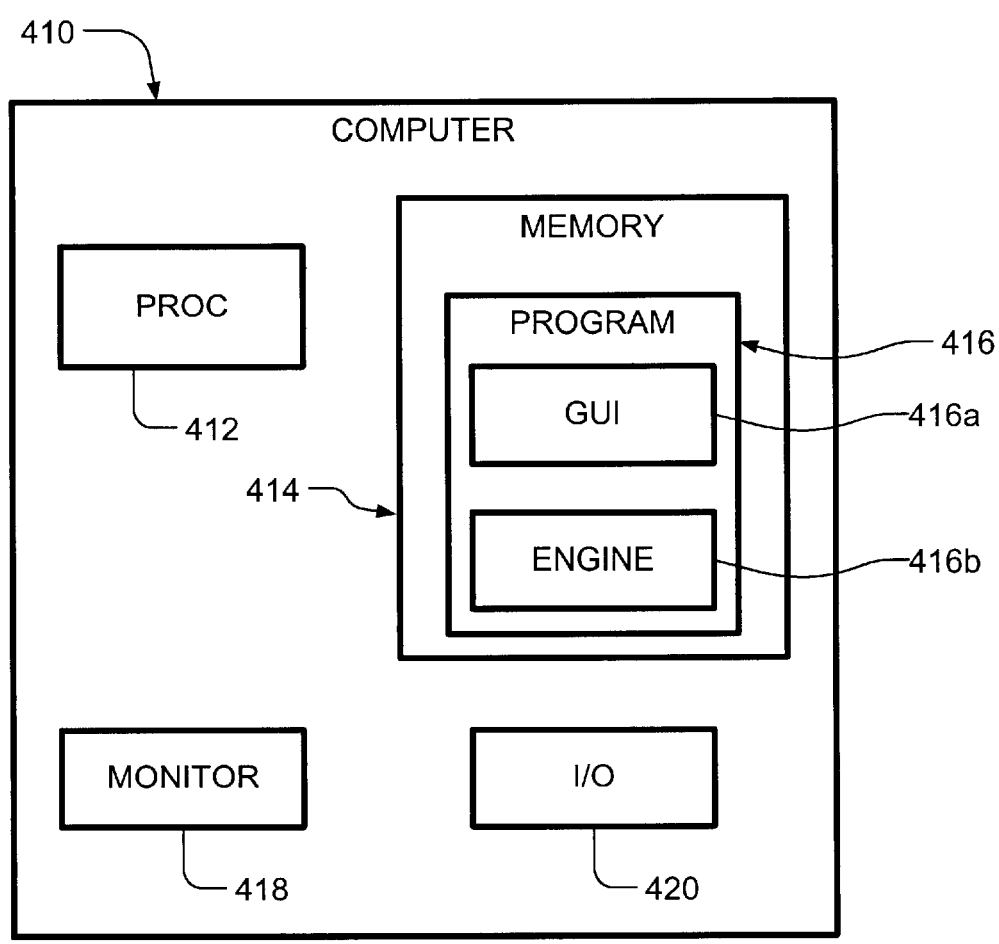
FIG. 4 is an illustration of a standalone image editing program.

The image editing program is not limited to a server-client architecture. For instance, the image editing program may be a standalone program. A machine such as a personal computer may be programmed to run the standalone program. A personal computer is shown in FIG. 4. The computer 410 includes a processor 412 and memory 414 storing the standalone program 416. Components of the program 416 include the graphical user interface 416a and the engine 416b. The computer 410 further includes a video monitor 418 for displaying the graphical user interface, and I/O devices 420 (e.g., a keyboard and mouse) for providing editing inputs.

The image editing program may be stored in any type of computer memory. Types of computer memory include, without limitation, magnetic memory, electronic memory, and optical memory.

Although specific embodiments of the present invention have been described and illustrated, the present invention is not limited to the specific forms or arrangements of parts so described and illustrated. Instead, the present invention is construed according to the claims the follow.

What is claimed is:

1. Means for generating a user interface for displaying a work area, and receiving image edit inputs; and
   an engine wherein the engine uses the grid elements to compute distances as percentages; and wherein the commands specify distances as percentages.

2. The program of claim 1, further comprising a cropping tool.

3. The program of claim 2, wherein specified grid elements are turned off in response to cropping of the image.

4. The program of claim 1, wherein precision of image editing is determined by granularity of the grid elements.

5. An image editing program comprising:

a user interface for displaying a work area, and receiving image edit inputs; and an engine for overlaying a grid on the work area, and using grid elements to compute distances as percentages and generate commands in response to the image edit inputs, the commands also specifying distances as percentages;

precision of image editing determined by granularity of the grid elements.

6. An article for a computing apparatus, the article comprising:

computer memory; and a program stored in the computer memory, the program, when executed, instructing the computing apparatus to display a digital image; overlay a grid on the image; receive image edit inputs; and use elements of the grid to compute commands in response to the image edit inputs, wherein the grid elements are used to compute distances as percentages; and wherein the commands specify distances as percentages.

7. The article of claim 6, the program providing a cropping tool.

8. The article of claim 7, wherein specified grid elements are turned off in response to cropping of the image.

9. The article of claim 6, wherein precision of image editing is determined by granularity of the grid elements.

10. A computing apparatus programmed to display a digital image; overlay a grid on the image; receive image edit inputs; and use elements of the grid to compute commands in response to the image edit inputs, wherein the grid elements are used to compute distances as percentages; and wherein the commands specify distances as percentages.

11. The computing apparatus of claim 10, programmed with a cropping tool for using the grid elements to compute commands in response to the image edit inputs.

12. The computing apparatus of claim 11, wherein grid elements are turned off in response to cropping of the image.

13. The computing apparatus of claim 10, wherein precision of image editing is determined by granularity of the grid elements.

14. Computing apparatus comprising:

means for displaying a digital image and receiving image edit inputs; and means for overlaying a grid on the digital image, and using elements of the grid to compute image edit commands in response to the image edit inputs, wherein the grid elements are used to compute distances as percentages; and wherein the commands specify distances as percentages.

15. A method of editing a digital image, the method comprising:

displaying the image;

overlaying grid elements on the displayed image;

receiving inputs representing edits on the image; and using the grid elements to compute image edit commands in response to the image edit inputs; and using the grid elements to compute distances as percentages; the commands specifying distances as percentages.

16. The method of claim 15, further comprising performing image cropping by turning off grid elements to at least partially obscure portions of the image that have been cropped.

17. The method of claim 15, wherein precision of image editing is determined by granularity of the grid elements.

* * * * *

UNITED STATES PATENT AND TRADEMARK OFFICE
CERTIFICATE OF CORRECTION

PATENT NO. : 6,844,885 B2
DATED : January 18, 2005
INVENTOR(S) : Jeff M. Anderson et al.

It is certified that error appears in the above-identified patent and that said Letters Patent is hereby corrected as shown below:

Column 4,
Line 59, delete "claims the follows" and insert -- claims that follow --.
Lines 61-65, delete Claim 1 and insert the following claim 1
-- A computer-readable medium having an image editing program comprising:
    means for generating a user interface for displaying a work area, and receiving image edit inputs; and
    an engine for overlaying a grid on the work area, and using grid elements to generate commands in response to the image edit input, wherein the engine uses the grid elements to compute distances as percentages; and wherein the commands specify distances as percentages. --.

Signed and Sealed this

Twenty-fourth Day of January, 2006

JON W. DUDAS
*Director of the United States Patent and Trademark Office*